(12) United States Patent
Miura

(10) Patent No.: US 10,461,315 B2
(45) Date of Patent: Oct. 29, 2019

(54) METHOD OF PRODUCING ELECTRODE

(71) Applicant: TOYOTA JIDOSHA KABUSHIKI KAISHA, Toyota-shi, Aichi-ken (JP)

(72) Inventor: Taishi Miura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 15/922,392

(22) Filed: Mar. 15, 2018

(65) Prior Publication Data

US 2018/0287138 A1    Oct. 4, 2018

(30) Foreign Application Priority Data

Mar. 30, 2017  (JP) ................. 2017-068484

(51) Int. Cl.
| | |
|---|---|
| *H01M 4/133* | (2010.01) |
| *H01M 4/04* | (2006.01) |
| *H01M 4/36* | (2006.01) |
| *H01M 10/052* | (2010.01) |
| *H01M 4/1393* | (2010.01) |
| *H01M 4/62* | (2006.01) |
| *H01M 10/0525* | (2010.01) |

(52) U.S. Cl.
CPC ............ *H01M 4/133* (2013.01); *H01M 4/04* (2013.01); *H01M 4/0404* (2013.01); *H01M 4/0416* (2013.01); *H01M 4/0433* (2013.01); *H01M 4/0435* (2013.01); *H01M 4/1393* (2013.01); *H01M 4/366* (2013.01); *H01M 4/62* (2013.01); *H01M 10/052* (2013.01); *H01M 10/0525* (2013.01)

(58) Field of Classification Search
CPC .. H01M 4/133; H01M 4/0404; H01M 4/0416; H01M 4/0433; H01M 4/1393; H01M 4/0435; H01M 4/04
See application file for complete search history.

(56) References Cited

U.S. PATENT DOCUMENTS

| | | | |
|---|---|---|---|
| 8,528,375 B2 * | 9/2013 | Hosoe | H01M 4/04 29/885 |
| 2008/0241696 A1 | 10/2008 | Hinoki et al. | |
| 2017/0110728 A1 * | 4/2017 | Kobayashi | H01M 4/0433 |
| 2017/0110729 A1 * | 4/2017 | Tsuchiya | H01M 4/587 |

FOREIGN PATENT DOCUMENTS

JP    2008-251401 A    10/2008

* cited by examiner

*Primary Examiner* — Stewart A Fraser
(74) *Attorney, Agent, or Firm* — Oliff PLC

(57) ABSTRACT

A method of producing an electrode includes preparing a temperature responsive polymer, preparing wet granules by mixing the temperature responsive polymer, a solvent, and active material particles, molding an active material film by sandwiching the wet granules between a first molding tool and a second molding tool, compressing the active material film by sandwiching the active material film between a third molding tool and a fourth molding tool, and disposing the active material film on a surface of a current collector.

9 Claims, 5 Drawing Sheets

METHOD OF PRODUCING ELECTRODE

INCORPORATION BY REFERENCE

The disclosure of Japanese Patent Application No. 2017-068484 filed on Mar. 30, 2017 including the specification, drawings and abstract is incorporated herein by reference in its entirety.

BACKGROUND

1. Technical Field

The present disclosure relates to a method of producing an electrode.

2. Description of Related Art

Japanese Unexamined Patent Application Publication No. 2008-251401 (JP 2008-251401 A) discloses an active material film (active material-containing layer) including a lower part and a surface layer part. In this active material film, active material particles contained in the surface layer part have a different particle size distribution from active material particles contained in the lower part.

SUMMARY

An electrode includes an active material film. When a density of the active material film becomes higher, a higher battery capacity can be expected. The density of the active material film may be adjusted according to a compression ratio during compression processing. When a compression ratio during compression processing becomes higher, the surface layer part of the active material film is likely to be locally crushed, and there are fewer voids in the surface layer part. As a result, it is thought that an electrolytic solution does not easily penetrate from a surface to the inside of the active material film and cycle durability deteriorates.

In JP 2008-251401 A, active material particles that are easily filled into the lower part of the active material film are used and active material particles that are not easily filled into the surface layer part of the active material film are used. Therefore, it is thought that voids are likely to remain in the surface layer part during compression processing. However, in order to form the active material film in JP 2008-251401 A, coating materials of two types are necessary. It is necessary to sequentially apply and dry the two types of coating materials.

The present disclosure provides a method of producing an electrode through which it is possible to form an active material film including more voids in a surface layer part than in a lower part.

A technical configuration and operations and effects of the present disclosure will be described below. The mechanism of action of the present disclosure includes assumptions. The scope of the claims should not be regarded as being limited according to the accuracy of the mechanism of action.

A first aspect of the present disclosure relates to a method of producing an electrode. The method of producing an electrode includes preparing a temperature responsive polymer, preparing wet granules by mixing the temperature responsive polymer, a solvent, and active material particles, molding an active material film by sandwiching the wet granules between a first molding tool and a second molding tool, compressing the active material film by sandwiching the active material film between a third molding tool and a fourth molding tool, and disposing the active material film on a surface of a current collector. The temperature responsive polymer swells when the temperature responsive polymer absorbs a solvent at a temperature that is lower than a lower critical solution temperature of the temperature responsive polymer, and contracts when the temperature responsive polymer releases the solvent at a temperature that is equal to or higher than the lower critical solution temperature. The first molding tool is maintained at a temperature that is lower than the lower critical solution temperature. All of the second molding tool, the third molding tool, and the fourth molding tool is maintained at a temperature that is equal to or higher than the lower critical solution temperature. The active material film is molded such that the active material film includes a first main surface and a second main surface. The first main surface is molded by the first molding tool. The second main surface is molded by the second molding tool. The active material film is disposed on the surface of the current collector such that the first main surface is positioned on a side of the temperature responsive polymer opposite to the current collector.

In the production method of the present disclosure, the active material film may be formed of a coating material of one type. The coating material is formed into wet granules. The wet granules are aggregates of granulated particles obtained by wet granulation. The granulated particles are formed by aggregating a plurality of active material particles. The wet granules retain a small amount of the solvent. Therefore, the wet granules that include the solvent may be compressed and processed.

The wet granules include a temperature responsive polymer. The temperature responsive polymer has a lower critical solution temperature (LCST). It is thought that the temperature responsive polymer swells when the temperature responsive polymer absorbs a solvent at a temperature that is lower than the LCST. It is thought that the temperature responsive polymer contracts when the temperature responsive polymer releases the solvent at a temperature that is equal to or higher than the LCST. It is thought that, when the wet granules are prepared, the temperature responsive polymer swells when the temperature responsive polymer absorbs the solvent.

The wet granules are molded into an active material film between the first molding tool being maintained at a temperature that is lower than the LCST and the second molding tool being maintained at a temperature that is equal to or higher than the LCST. On the side of the active material film that is molded by the second molding tool (the side of the second main surface), the temperature responsive polymer is heated at a temperature that is equal or higher than the LCST. Accordingly, the temperature responsive polymer is thought to release the solvent and contract. That is, there are thought to be fewer voids on the side of the second main surface.

On the other hand, on the side that is molded by the first molding tool (the side of the first main surface), the temperature responsive polymer may be maintained at a temperature that is lower than the LCST. Therefore, the temperature responsive polymer is thought to maintain a swollen state.

Next, the active material film is sandwiched between the third molding tool and the fourth molding tool being maintained at a temperature that is equal to or higher than the LCST. Accordingly, the active material film is compressed. During compression, when the active material film receives heat from both sides of the active material film, the solvent included in the active material film may be volatilized. In addition, at this time, the temperature responsive polymer swells on the side of the first main surface, and the temperature responsive polymer contracts on the side of the second main surface. As a result, in the active material film after compression, it is thought that many voids occur on the side of the first main surface and few voids occur on the side of the second main surface.

In the production method of the present disclosure, the active material film is disposed on the surface of the current collector such that the first main surface is positioned on the side of the active material film opposite to the current collector. That is, the first main surface becomes the side of the surface layer part and the second main surface becomes the side of the lower part. As described above, it is thought that more voids occur on the side of the first main surface than the side of the second main surface. Therefore, an electrode including more voids in the surface layer part than in the lower part may be provided.

In the first aspect, all of the first molding tool, the second molding tool, the third molding tool, and the fourth molding tool may be rotating rollers. When the molding tools are rotating rollers, improvement in productivity can be expected.

In the first aspect, the temperature responsive polymer may include poly-N-isopropylacrylamide, hydroxypropylcellulose, or polyvinyl methyl ether.

In the first aspect, the temperature responsive polymer may be poly-N-isopropylacrylamide and the solvent may be water. Poly-N-isopropylacrylamide (PNIPAM) has an LCST of 32° C. That is, PNIPAM absorbs water at lower than 32° C. and dehydrates at 32° C. or higher. Since the LCST is a temperature close to room temperature, easy adjustment of the temperature of each molding tool can be expected.

In the first aspect, the active material particles may be graphite particles. The graphite particles may function as negative electrode active material particles of a lithium ion secondary battery. The graphite particles have a crystal structure that is easily aligned. Since graphite particles of the surface layer part are oriented in the active material film including graphite particles during molding and compressing, there are likely to be fewer voids in the surface layer part. According to the above production method, even in the active material film including graphite particles, many voids may be formed in the surface layer part.

In the first aspect, a proportion of the solvent with respect to a solid content of the wet granules may be 35 mass % or less.

In the first aspect, a proportion of the temperature responsive polymer with respect to a solid content of the wet granules may be 0.5 mass % to 2.0 mass %.

In the first aspect, a proportion of the active material particles with respect to a solid content of the wet granules may be 80 mass % to 99 mass %.

A second aspect of the present disclosure relates to a method of producing an electrode. The method of producing an electrode includes preparing a temperature responsive polymer, preparing wet granules by mixing the temperature responsive polymer, the solvent, and active material particles, molding an active material film by sandwiching the wet granules between a first molding tool and a second molding tool, heating the second main surface to a temperature that is equal to or higher than a lower critical solution temperature of the temperature responsive polymer while maintaining the first main surface at a temperature that is lower than the lower critical solution temperature, compressing the active material film by sandwiching the active material film between a third molding tool and a fourth molding tool, heating the first main surface and the second main surface to a temperature that is equal to or higher than the lower critical solution temperature, and disposing the active material film on a surface of a current collector. The temperature responsive polymer swells when the temperature responsive polymer absorbs a solvent at a temperature that is lower than the lower critical solution temperature and contracts when the temperature responsive polymer releases the solvent at a temperature that is equal to or higher than the lower critical solution temperature. The active material film is molded such that the active material film includes a first main surface and a second main surface. The active material film is disposed on the surface of the current collector such that the first main surface is positioned on the side of the active material film opposite to the current collector.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments (hereinafter referred to as the "present embodiment") of the present disclosure will be described below. However, the following description does not limit the scope of the claims.

<Method of Producing Electrode>

A method of producing an electrode for a lithium ion secondary battery will be described below. However, the electrode of the present embodiment is not limited to an electrode for a lithium ion secondary battery. For example, the electrode of the present embodiment may be an electrode for a lithium primary battery or an electrode for a sodium ion secondary battery. The electrode may be a negative electrode or a positive electrode.

Figure 1:
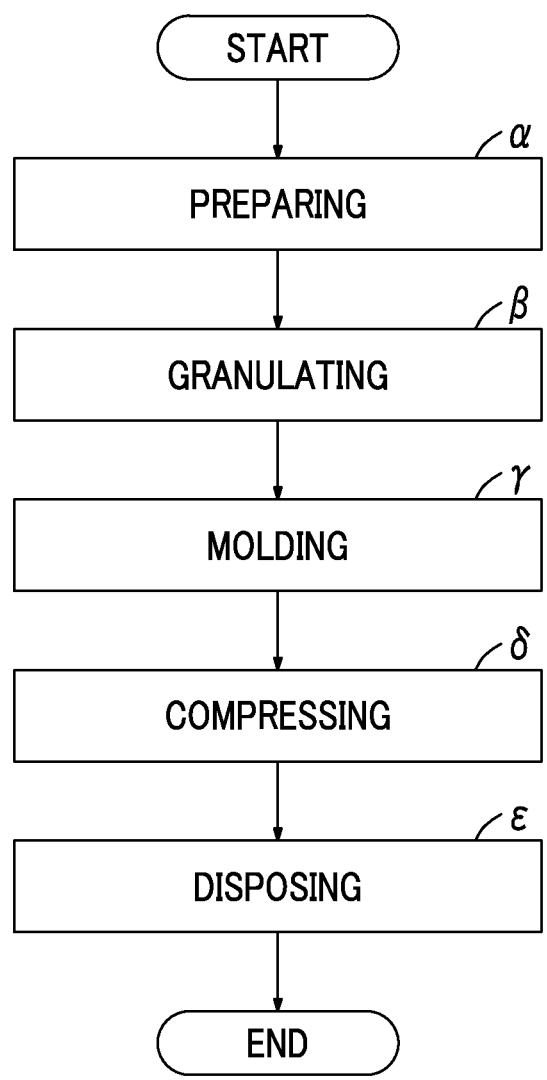
FIG. 1 is a flowchart showing an outline of a method of producing an electrode according to an embodiment of the present disclosure.

FIG. 1 is a flowchart showing an outline of a method of producing an electrode according to an embodiment of the present disclosure. The method of producing an electrode of the present embodiment includes "(α) preparing," "(β) granulating," "(γ) molding," "(δ) compressing," and "(ε) disposing." "(ε) disposing" may be performed at any timing after "(β) granulating." For example, "(ε) disposing" may be performed at the same time as "(γ) molding" or may be performed at the same time as "(δ) compressing." The production method of the present embodiment will be described below according to these procedures.

<(α) Preparing>

The production method of the present embodiment includes preparing of a temperature responsive polymer having a lower critical solution temperature (LCST). The temperature responsive polymer swells when the temperature responsive polymer absorbs a solvent at a temperature that is lower than the LCST and contracts when the temperature responsive polymer releases a solvent at a temperature that is equal to or higher than the LCST.

Examples of the temperature responsive polymer include poly-N-isopropylacrylamide (PNIPAM), hydroxypropylcellulose (HPC), and polyvinyl methyl ether (PVME). A temperature responsive polymer of one type may be used alone, or temperature responsive polymers of two or more types may be used in combination. Among temperature responsive polymers, PNIPAM has a small change in LCST in a wide molecular weight range and a solution concentration range and is easy to handle.

In the case of a known temperature responsive polymer, the LCST may have a literature value. For example, PNIPAM may have an LCST of 32° C. HPC may have an LCST of 45° C. PVME may have an LCST of 35° C. In the case of an unknown temperature responsive polymer, the LCST is obtained by measurement. For example, a 1 mass % aqueous solution of the temperature responsive polymer is prepared. The aqueous solution is heated at a rate of about 1° C./min. The visible light transmittance of the aqueous solution is measured. A temperature at which the visible light transmittance is 50% may be obtained as the LCST.

<(β) Granulating>

The production method of the present embodiment includes preparing of wet granules by mixing the temperature responsive polymer, a solvent, and active material particles.

A general stirrer may be used for a granulation operation. For example, a "high speed mixer" (commercially available from Earth Technica Co., Ltd.) may be used. According to the LCST of the temperature responsive polymer, a stirrer including a cooling jacket may be used. As the solvent, a solvent that the temperature responsive polymer can absorb at a temperature that is lower than the LCST is selected. For example, when the temperature responsive polymer is PNIPAM or the like, water may be used. That is, the temperature responsive polymer may be PNIPAM and the solvent may be water. However, according to a type of the temperature responsive polymer, an organic solvent such as N-methyl-2-pyrrolidone (NMP) may be used.

A solid content proportion of a mixture is adjusted such that the mixture forms wet granules. The solid content proportion indicates a proportion of components other than the solvent. In the wet granules, an amount of solvent is small. Gaps between particles are not filled with the solvent. Therefore, it is thought that, in the wet granules, the temperature responsive polymer is not completely dissolved in the solvent, and may swell when the temperature responsive polymer absorbs the solvent. The solid content proportion may be, for example, 65 mass % or greater and less than 100 mass % or 70 mass % or greater and less than 100 mass %, or 80 mass % or greater and less than 100 mass %. In other words, a proportion of the solvent with respect to the solid content of wet granules may be, for example, 35 mass % or less, 30 mass % or less, or 20 mass % or less.

A particle size distribution of wet granules may be adjusted by a solid content proportion, a stirring rate, and the like. For example, wet granules having an average particle size of 100 μm to 5 mm may be prepared. The average particle size of wet granules refers to a particle size of cumulative 50% from the side of fine particles in a mass-based particle size distribution measured according to "JISK0069: test methods for sieving of chemical products."

During granulation, it is thought that the temperature responsive polymer swells when the temperature responsive polymer absorbs the solvent. For example, a proportion of the temperature responsive polymer with respect to the solid content of wet granules may be 0.5 mass % or more and 2.0 mass % or less, 0.5 mass % or more and 1.0 mass % or less, and 1.0 mass % or more and 2.0 mass % or less.

The active material particles are particles made of an electrode active material. For example, the active material particles may have an average particle size of 1 μm to 30 μm. The average particle size of the active material particles refers to a particle size of cumulative 50% from the side of fine particles in a volume-based particle size distribution measured according to a laser diffraction scattering method.

The active material particles are not particularly limited. The active material particles may be negative electrode active material particles or positive electrode active material particles. The negative electrode active material particles may be, for example, graphite particles, easily graphitizable carbon particles, non-graphitizable carbon particles, silicon particles, silicon oxide particles, tin particles, or tin oxide particles. That is, the active material particles may be graphite particles. The graphite particles have a crystal structure that is easily aligned. Since graphite particles of the surface layer part are oriented in the active material film including graphite particles during molding and compressing, there are likely to be fewer voids in the surface layer part. However, in the present embodiment, even in the active material film including graphite particles, many voids may be formed in the surface layer part. Negative electrode active material particles of one type may be used alone, and negative electrode active material particles of two or more types may be used in combination.

The positive electrode active material particles may be, for example, $LiCoO_2$ particles, $LiNiO_2$ particles, $LiMnO_2$ particles, $LiNi_{1/3}Co_{1/3}Mn_{1/3}O_2$ particles, $LiNi_{0.8}Co_{0.15}Al_{0.05}O_2$ particles, $LiMn_2O_4$ particles, or $LiFePO_4$ particles. Positive electrode active material particles of one type may be used alone or positive electrode active material particles of two or more types may be used in combination. For example, a proportion of the active material particles with respect to the solid content of wet granules may be 80 mass % to 99 mass %.

As long as the temperature responsive polymer, the solvent, and the active material particles are mixed together, other components may be mixed in. Examples of other components include a conductive material and a binder. The conductive material is not particularly limited. Examples of the conductive material include acetylene black, thermal black, furnace black, and vapor grown carbon fibers (VGCF). A conductive material of one type may be used alone or conductive materials of two or more types may be used in combination. For example, when active material particles having favorable electron conductivity such as graphite particles are used, no conductive material may be used. For example, a proportion of the conductive material with respect to the solid content of wet granules may be 0 mass % to 10 mass %.

The binder is not particularly limited. Examples of the binder include carboxymethyl cellulose (CMC), styrene butadiene rubber (SBR), polytetrafluoroethylene (PTFE), polyacrylic acid (PAA), and polyvinylidene fluoride (PVdF). A binder of one type may be used alone or binders of two or more types may be used in combination. For example, when a temperature responsive polymer that can also function as a binder such as HPC is used, no binder may be used. For example, a proportion of the binder with respect to the solid content of wet granules may be 0 mass % to 8 mass % and 0.5 mass % to 8 mass %.

<(γ) Molding>

The production method of the present embodiment includes molding of the active material film by sandwiching wet granules between a first molding tool and a second molding tool.

Figure 2:
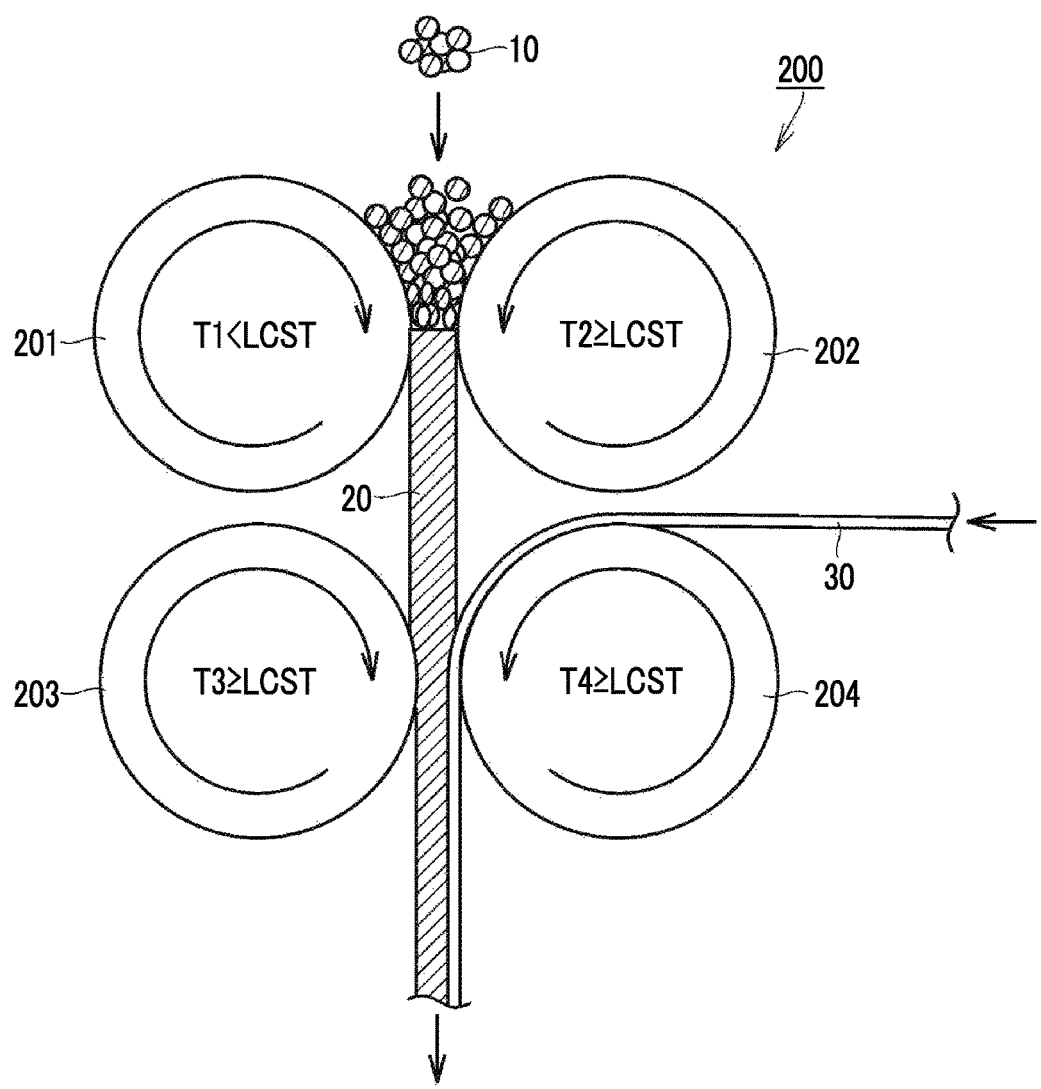
FIG. 2 is a conceptual cross-sectional view showing an example of a configuration of a film forming device.

FIG. 2 is a conceptual cross-sectional view showing an example of a configuration of a film forming device. A film forming device 200 includes a first molding tool 201, a second molding tool 202, a third molding tool 203, and a fourth molding tool 204. The first molding tool 201 and the second molding tool 202 form a pair. The third molding tool 203 and the fourth molding tool 204 form a pair.

All of the first molding tool 201, the second molding tool 202, the third molding tool 203 and the fourth molding tool 204 are rotating rollers. Improvement in productivity can be expected because the molding tools are rotating rollers. However, as long as wet granules 10 can be molded and compressed, the molding tool is not limited to a rotating roller. For example, the pair of the first molding tool 201 and the second molding tool 202 and the pair of the third molding tool 203 and the fourth molding tool 204 may be a pair of a punch and a die.

The first molding tool 201 is maintained at a temperature that is lower than the LCST. The first molding tool 201 may be a general molding roll. For example, the first molding tool 201 can be cooled by circulation of a heat medium.

The second molding tool 202, the third molding tool 203, and the fourth molding tool each may be maintained at a temperature that is equal to or higher than the LCST. The second molding tool 202, the third molding tool 203, and the fourth molding tool may be heating rollers. Examples of the heating roller include a steam type, a heating medium circulation type, and an induction heating type heating roller. A temperature of each of the molding tools may be measured by a general surface thermometer.

Figure 3:
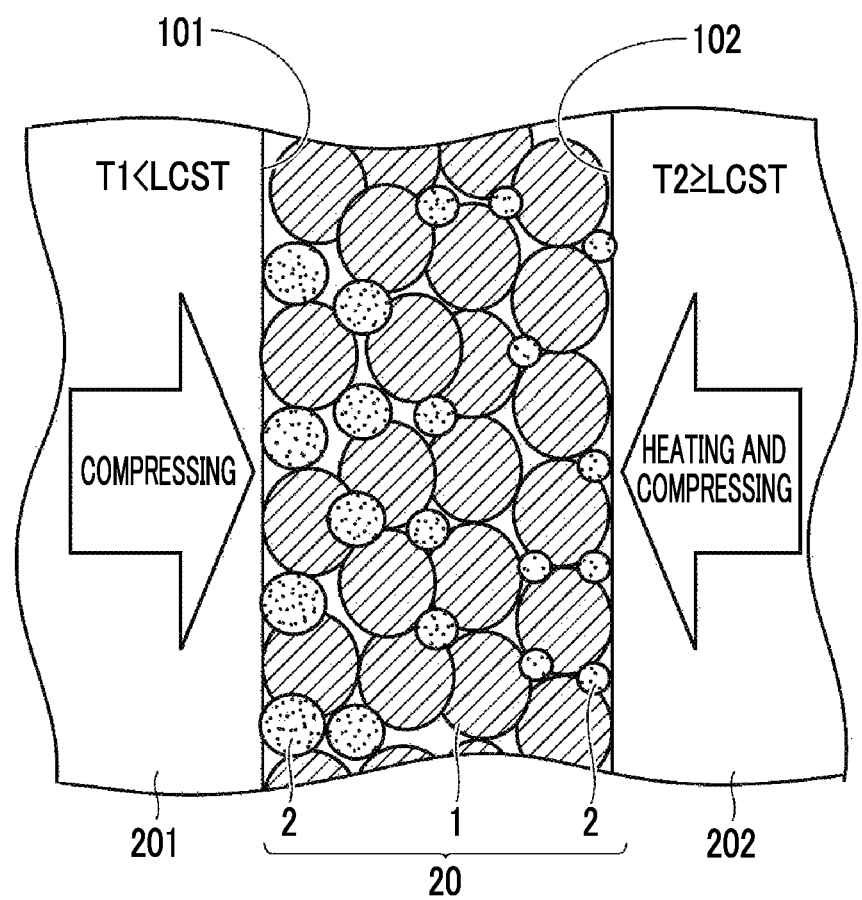
FIG. 3 is a conceptual cross-sectional view for explaining molding.
Figure 4:
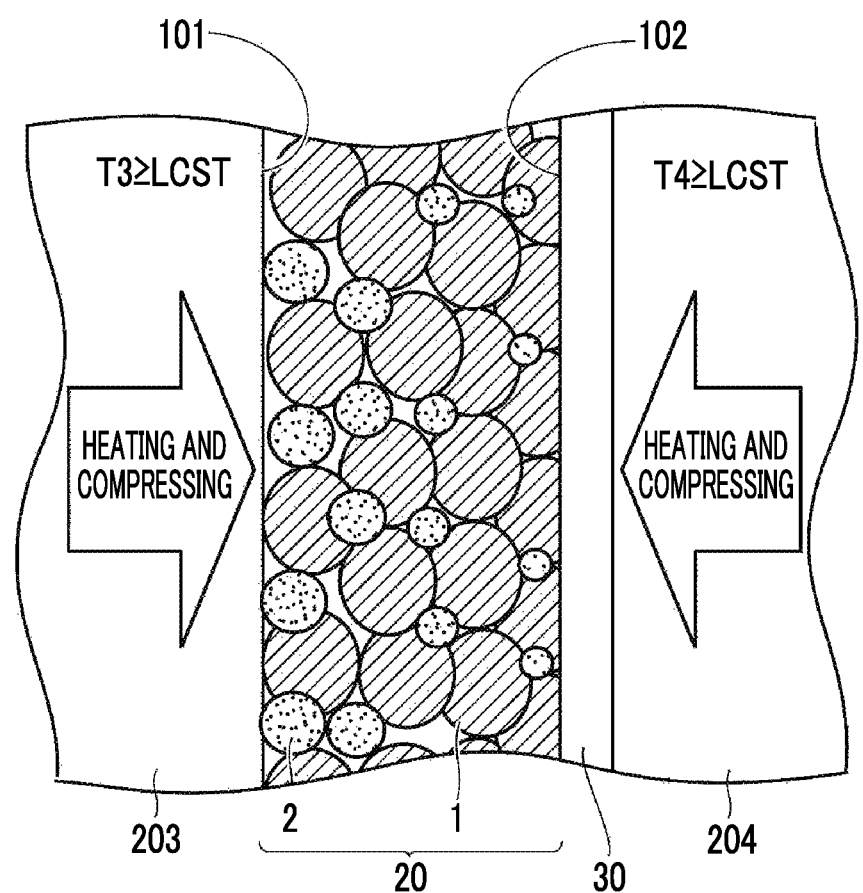
FIG. 4 is a conceptual cross-sectional view for explaining compression.

In FIG. 2 to FIG. 4, "T1<LCST" indicates that the first molding tool 201 is maintained at a temperature that is lower than the LCST. "T2≥LCST" indicates that the second molding tool 202 is maintained at a temperature that is equal to or higher than the LCST. "T3≥LCST" indicates that the third molding tool 203 is maintained at a temperature that is equal to or higher than the LCST. "T4≥LCST" indicates that the fourth molding tool 204 is maintained at a temperature that is equal to or higher than the LCST.

As shown in FIG. 2, the wet granules 10 are supplied between the first molding tool 201 and the second molding tool 202. That is, the wet granules 10 are supplied to a gap between the pair of rotating rollers. The wet granules 10 are sandwiched between the first molding tool 201 and the second molding tool 202. Accordingly, the wet granules 10 are made in the form of a film, and an active material film 20 is molded.

FIG. 3 is a conceptual cross-sectional view for explaining molding. The active material film 20 is molded such that the active material film includes a first main surface 101 and a second main surface 102. The first main surface 101 is molded by the first molding tool 201. The second main surface 102 is molded by the second molding tool 202.

The active material film 20 includes active material particles 1 and a temperature responsive polymer 2. On the side of the second main surface 102, the temperature responsive polymer 2 is heated to a temperature that is equal to or higher than the LCST. The heated temperature responsive polymer 2 contracts (becomes smaller) when the heated temperature responsive polymer 2 releases the solvent. On the side of the first main surface 101, the temperature responsive polymer 2 may have a temperature that is lower than the LCST. On the side of the first main surface 101, the temperature responsive polymer 2 may remain swollen (remain large).

Here, in this specification, the wet granules 10 and the active material film 20 may not be in direct contact with the molding tools as long as they are sandwiched between two molding tools. For example, a current collector 30 (FIG. 4) may be interposed between the wet granules 10 and the second molding tool 202. In this case, the wet granules 10 are assumed to be sandwiched between the first molding tool 201 and the second molding tool 202.

<(δ) Compressing>

The production method of the present embodiment includes compressing of the active material film by sandwiching the active material film between the third molding tool and the fourth molding tool.

As shown in FIG. 2, the active material film 20 is supplied between the third molding tool 203 and the fourth molding tool 204. That is, the active material film 20 is supplied to a gap between the pair of rotating rollers. The active material film 20 is sandwiched between the third molding tool 203 and the fourth molding tool 204. Accordingly, the active material film 20 is compressed.

FIG. 4 is a conceptual cross-sectional view for explaining compression. As described above, in the active material film 20, the temperature responsive polymer 2 swells on the side of the first main surface 101, and the temperature responsive polymer 2 contracts on the side of the second main surface 102. During compression, the active material film 20 is heated from both the side of the first main surface 101 and the side of the second main surface 102. Accordingly, the solvent is assumed to be volatilized. When the solvent is volatilized, many voids are thought to be formed on the side of the first main surface 101. This is because the temperature responsive polymer 2 swells and a large amount of the solvent remains.

<(ε) Disposing>

The production method of the present embodiment includes disposing of the active material film on a surface of the current collector. In the present embodiment, the active material film 20 is disposed on a surface of the current collector 30 such that the first main surface 101 is positioned on the side of the active material film 20 opposite to the current collector 30.

As described above, "(ε) disposing" may be performed at any timing after "(β) granulating." Here, as an example, a case in which "(ε) disposing" is performed at the same time as "(δ) compressing" will be described.

As shown in FIG. 2 and FIG. 4, the current collector 30 is sandwiched between the third molding tool 203 and the fourth molding tool 204 together with the active material film 20. Accordingly, the active material film 20 is compressed and also the active material film 20 is clamped on the surface of the current collector 30. When the third molding tool 203 and the fourth molding tool 204 are rotating rollers, a peripheral speed of the fourth molding tool 204 is higher than a peripheral speed of the third molding tool 203. A shear force is generated due to a peripheral speed difference. The active material film 20 is rubbed against the surface of the current collector 30 due to the shear force, and the active material film 20 may be transferred to the surface of the current collector 30.

The current collector 30 may be, for example, a metal foil. The metal foil may be, for example, a copper (Cu) foil or an aluminum (Al) foil. For example, the current collector 30 may have a thickness of 5 μm to 30 μm. Thicknesses of components in this specification may be measured by, for example, a micrometer. The thickness may be measured in a microscope cross-sectional image of each component.

The active material film 20 may be disposed on both front and back surfaces of the current collector 30. After the active material film 20 is disposed on the surface of the current collector 30, when the solvent remains in the active material film 20, the active material film 20 may be dried using hot air and the like.

<Electrode>

Figure 5:
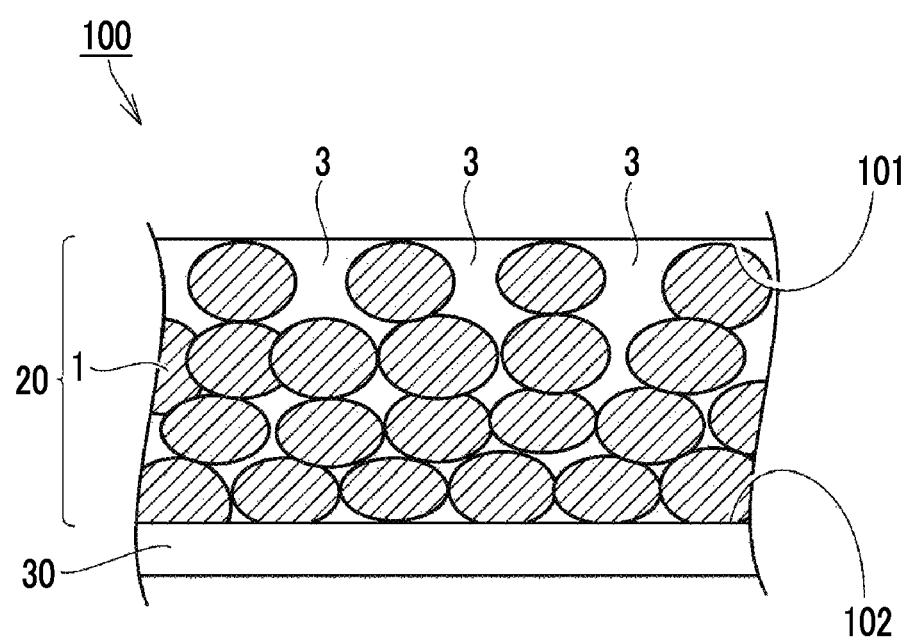
FIG. 5 is a conceptual cross-sectional view showing an example of a configuration of an electrode.

Accordingly, an electrode 100 including the active material film 20 and the current collector 30 is produced. FIG. 5 is a conceptual cross-sectional view showing an example of a configuration of an electrode. The active material film 20 is disposed on the surface of the current collector 30. The active material film 20 includes the active material particles 1. The active material film 20 includes the first main surface 101 and the second main surface 102. The first main surface 101 constitutes a surface of the electrode 100. On the side of the first main surface 101 (on the side of the surface layer part), a plurality of voids 3 are formed. On the side of the second main surface 102 (on the side of the lower part), there are few voids 3. Therefore, the electrolytic solution easily penetrates into the active material film 20 and the entire active material film 20 may have a high density.

The electrode 100 that is cut into a predetermined shape (for example, a belt-like) according to specifications of a battery may be used. A battery including the electrode 100 of the present embodiment is expected to have a high capacity and excellent cycle durability. This is because the electrolytic solution easily penetrates into the active material film 20 and the entire active material film 20 may have a high density.

For example, the active material film 20 may have a thickness of 10 μm to 100 μm. When the active material particles 1 are graphite particles, for example, the active material film 20 (dried state) may have a density of 1.4 g/cm$^3$ to 1.8 g/cm$^3$ or a density of 1.5 g/cm$^3$ to 1.7 g/cm$^3$.

Examples will be described below. However, the following examples do not limit the scope of the claims.

Example 1

<(α) Preparing>

As a temperature responsive polymer, PNIPAM having an LCST of 32° C. was prepared.

<(β) Granulating>

The following materials were prepared.
Active material particles: Graphite particles, Binder: CMC, Solvent: water (deionized water)

The temperature responsive polymer, the solvent, the active material particles, and the binder were mixed to prepare wet granules. The solid content proportion was 68 mass %. A composition of the solid content was "active material particles:binder:temperature responsive polymer=98.5:1:0.5" by mass ratio.

<(γ) Molding>

The film forming device 200 shown in FIG. 2 was prepared. The first molding tool 201 was a general molding roller. The first molding tool 201 was assumed to be at about room temperature (10° C. to 30° C.), that is, a temperature that was lower than the LCST of PNIPAM. All of the second molding tool 202, the third molding tool 203 and the fourth molding tool 204 were heating rollers. A temperature of the molding tools was adjusted to 50° C. 50° C. is a temperature that was equal to or higher than the LCST of PNIPAM.

The wet granules 10 were supplied between the first molding tool 201 and the second molding tool 202. The wet granules 10 were sandwiched between the first molding tool 201 and the second molding tool 202. Accordingly, the active material film 20 was molded. The active material film 20 was molded such that the active material film had the first main surface 101 and the second main surface 102. The first main surface 101 was molded by the first molding tool 201, and the second main surface 102 was molded by the second molding tool 202.

<(δ) Compressing and (ε) Disposing>

A Cu foil was prepared as the current collector 30. The active material film 20 and the current collector 30 were supplied between the third molding tool 203 and the fourth molding tool 204. The active material film 20 was sandwiched between the third molding tool 203 and the fourth molding tool 204. Accordingly, the active material film 20 was compressed. At the same time, the active material film 20 was disposed on a surface of the current collector 30. The active material film 20 was disposed on the surface of the current collector 30 such that the first main surface 101 was positioned on the side of the active material film opposite to the current collector 30 (the second main surface 102 came in contact with the current collector 30).

Accordingly, the electrode 100 (a negative electrode for a lithium ion secondary battery) was produced. A density of the active material film 20 (after drying) was 1.6 g/cm$^3$.

<Production of Battery>

The electrode 100 (negative electrode) was cut into a rectangular shape. A predetermined positive electrode and a predetermined separator were prepared. As positive electrode active material particles, $LiNi_{1/3}Co_{1/3}Mn_{1/3}O_2$ particles were used. The positive electrode, the separator, and the negative electrode were laminated such that the positive electrode and the negative electrode faced each other with the separator interposed between. Accordingly, an electrode group was produced.

As an exterior body, a bag made of an aluminum laminate film was prepared. The electrode group was accommodated in the exterior body. A predetermined electrolytic solution was injected into the exterior body. The exterior body was sealed. Accordingly, a lithium ion secondary battery (laminate battery) was produced.

Examples 2 and 3

As shown in the following Table 1, an electrode was produced and a battery was produced in the same manner as in Example 1 except that a mass ratio of a temperature responsive polymer was changed.

Comparative Example 1

An electrode was produced in the same manner as in Example 1 except that wet granules containing no temperature responsive polymer were prepared, all of a first molding tool, a second molding tool, a third molding tool, and a fourth molding tool were general molding rollers, a density of an active material film was 1.4 g/cm$^3$, and the density was adjusted by reducing a mass per unit area (weight per unit area) of the active material film.

A battery was produced in the same manner as in Example 1 except that a positive electrode having a small weight per unit area was prepared according to a weight per unit area of the electrode (negative electrode).

Comparative Example 2

An electrode was produced and a battery was produced in the same manner as in Comparative Example 1 except that a density of an active material film was 1.6 g/cm$^3$.

Comparative Example 3

An electrode was produced and a battery was produced in the same manner as in Example 1 except that all of a first molding tool, a second molding tool, a third molding tool, and a fourth molding tool were general molding rollers.

Comparative Example 4

An electrode was produced and a battery was produced in the same manner as in Example 1 except that all of a first molding tool, a second molding tool, a third molding tool, and a fourth molding tool were heating rollers, and a temperature of each of the molding tools was adjusted to 50° C.

Evaluation

Initial capacities of the batteries were measured. The results are shown in the following Table 1. In Table 1, the value in the column of the initial capacity is a value obtained by dividing the initial capacity in each example by the initial capacity in Comparative Example 2.

According to predetermined conditions, charging and discharging were repeated over 500 cycles. A capacity retention rate was calculated by dividing a discharging capacity after 500 cycles by an initial discharging capacity. The results are shown in the following Table 1. A higher capacity retention rate indicates superior cycle durability.

Examples 1 to 3 had excellent cycle durability compared to the comparative examples. This is thought to have been caused by the fact that voids were formed in the surface layer part of the active material film due to the temperature responsive polymer and the electrolytic solution easily penetrated into the active material film.

In Comparative Examples 3 and 4, the capacity retention rate was low. It is thought that, since the behavior of the temperature responsive polymer is the same on both the side of the first main surface and the side of the second main surface during molding and compressing, voids could not be unevenly distributed in the surface layer part.

The embodiments and examples disclosed here are only examples in all respects and should not be considered as restrictive. While molding wet granules using the second molding tool and heating the temperature responsive polymer to a temperature that is equal to or higher than the LCST were performed at the same time in the above example, molding and heating may be separately performed. In addition, while compressing and molding of the third molding tool and the fourth molding tool and heating of the temperature responsive polymer to a temperature that is equal to or higher than the LCST are performed at the same time, compressing and molding, and heating may be separately performed. The technical range defined by the scope of the claims includes meanings equivalent to the scope of the claims and all modifications within the scope.

TABLE 1

List of examples and comparative examples

| | (α) Preparing Temperature responsive polymer | | (β) Granulating | | | (γ) Molding | | (δ) Compressing | | Electrode Active material film Density | Evaluation | |
|---|---|---|---|---|---|---|---|---|---|---|---|---|
| | | | Temperature responsive polymer PNIPAM | Solvent Water | Active material particles Graphite particles | First molding tool | Second molding tool | Third molding tool | Fourth molding tool | | Initial capacity | Capacity retention rate |
| | Type | LCST | (mass %) | (mass %) | (mass %) | T1 | T2 | T3 | T4 | (g/cm³) | (—) | (%) |
| Comparative Example 1 | — | — | 0 | 1.00 | 99.00 | Lower than 32° C. | Lower than 32° C. | Lower than 32° C. | Lower than 32° C. | 1.4 | 0.86 | 96 |
| Comparative Example 2 | — | — | 0 | 1.00 | 99.00 | Lower than 32° C. | Lower than 32° C. | Lower than 32° C. | Lower than 32° C. | 1.6 | 1 | 81 |
| Comparative Example 3 | PNIPAM | 32° C. | 0.5 | 1.00 | 98.50 | Lower than 32° C. | Lower than 32° C. | Lower than 32° C. | Lower than 32° C. | 1.6 | 0.97 | 83 |
| Comparative Example 4 | PNIPAM | 32° C. | 0.5 | 1.00 | 98.50 | 50° C. | 50° C. | 50° C. | 50° C. | 1.6 | 0.97 | 82 |
| Example 1 | PNIPAM | 32° C. | 0.5 | 1.00 | 98.50 | Lower than 32° C. | 50° C. | 50° C. | 50° C. | 1.6 | 0.97 | 85 |
| Example 2 | PNIPAM | 32° C. | 1.0 | 0.99 | 98.01 | Lower than 32° C. | 50° C. | 50° C. | 50° C. | 1.6 | 0.95 | 97 |
| Example 3 | PNIPAM | 32° C. | 2.5 | 0.98 | 97.02 | Lower than 32° C. | 50° C. | 50° C. | 50° C. | 1.6 | 0.91 | 98 |

In Comparative Example 1, the initial capacity was low. This is because the density of the active material film was low. In Comparative Example 2, since the density of the active material film was high, the initial capacity was improved compared to Comparative Example 1. However, a capacity retention rate after cycling was lower than in Comparative Example 1. This is thought to have been caused by the fact that there were fewer voids in the surface layer part of the active material film because the density of the active material film increased.

What is claimed is:
1. A method of producing an electrode comprising:
preparing a temperature responsive polymer swelling when the temperature responsive polymer absorbs a solvent at a temperature that is lower than a lower critical solution temperature of the temperature responsive polymer and contracting when the temperature responsive polymer releases the solvent at a temperature that is equal to or higher than the lower critical solution temperature;

preparing wet granules by mixing the temperature responsive polymer, the solvent, and active material particles;

molding an active material film by sandwiching the wet granules between a first molding tool and a second molding tool, the first molding tool being maintained at a temperature that is lower than the lower critical solution temperature, the second molding tool being maintained at a temperature that is equal to or higher than the lower critical solution temperature, the active material film including a first main surface and a second main surface, the first main surface being molded by the first molding tool, and the second main surface being molded by the second molding tool; and compressing the active material film by sandwiching the active material film between a third molding tool and a fourth molding tool, the third molding tool and the fourth molding tool being maintained at a temperature that is equal to or higher than the lower critical solution temperature; and disposing the active material film on a surface of a current collector such that the first main surface is positioned on a side of the active material film opposite to the current collector.

2. The method according to claim 1, wherein all of the first molding tool, the second molding tool, the third molding tool, and the fourth molding tool are rotating rollers.

3. The method according to claim 1, wherein the temperature responsive polymer includes poly-N-isopropylacrylamide, hydroxypropylcellulose, or polyvinyl methyl ether.

4. The method according to claim 1, wherein the temperature responsive polymer is poly-N-isopropylacrylamide, and the solvent is water.

5. The method according to claim 1, wherein the active material particles are graphite particles.

6. The method according to claim 1, wherein a proportion of the solvent with respect to a solid content of the wet granules is 35 mass % or less.

7. The method according to claim 1, wherein a proportion of the temperature responsive polymer with respect to a solid content of the wet granules is 0.5 mass % to 2.0 mass %.

8. The method according to claim 1, wherein a proportion of the active material particles with respect to a solid content of the wet granules is 80 mass % to 99 mass %.

9. A method of producing an electrode comprising:

preparing a temperature responsive polymer swelling when the temperature responsive polymer absorbs a solvent at a temperature that is lower than a lower critical solution temperature of the temperature responsive polymer and contracting when the temperature responsive polymer releases the solvent at a temperature that is equal to or higher than the lower critical solution temperature;

preparing wet granules by mixing the temperature responsive polymer, the solvent, and active material particles;

molding an active material film by sandwiching the wet granules between a first molding tool and a second molding tool, the active material film including a first main surface and a second main surface;

heating the second main surface to a temperature that is equal to or higher than the lower critical solution temperature while maintaining the first main surface at a temperature that is lower than the lower critical solution temperature;

compressing the active material film by sandwiching the active material film between a third molding tool and a fourth molding tool; and heating the first main surface and the second main surface to a temperature that is equal to or higher than the lower critical solution temperature; and disposing the active material film on a surface of a current collector such that the first main surface is positioned on a side of the active material film opposite to the current collector.

* * * * *